United States Patent
Graybill

[15] 3,643,003
[45] Feb. 15, 1972

[54] TRANSFORMER TERMINATION FOR METAL-ENCLOSED, COMPRESSED-GAS-INSULATED ELECTRICAL CONDUCTORS

[72] Inventor: Howard W. Graybill, Greensburg, Pa.
[73] Assignee: I-T-E Imperial Corporation, Philadelphia, Pa.
[22] Filed: Apr. 24, 1970
[21] Appl. No.: 31,590

[52] U.S. Cl. ..............................174/18, 174/31 R, 174/142, 174/DIG. 10
[51] Int. Cl. ......................................................H01b 17/26
[58] Field of Search .........174/11 BH, 12 BH, 14 BH, 15 BH, 174/16 BH, 18, 31 R, 142, 152 R, DIG. 10

[56] References Cited
UNITED STATES PATENTS 3,239,599  3/1966  Linderholm .........................174/18 X

FOREIGN PATENTS OR APPLICATIONS 21,135  9/1968  Japan ...............................174/15 BH

*Primary Examiner*—Laramie E. Askin
*Attorney*—Ostrolenk, Faber, Gerb & Soffen

[57] ABSTRACT

The grounded enclosure tube of the compressed-gas-insulated electrical conductor is attached to the metal wall of a power transformer tank and the energized conductor tube extends into the interior of the transformer tank wherein it is supported and insulated from the tank wall to provide a simple and inexpensive connection between metal enclosed switchgear, for example, and power transformers in a high-voltage electrical substation.

7 Claims, 2 Drawing Figures

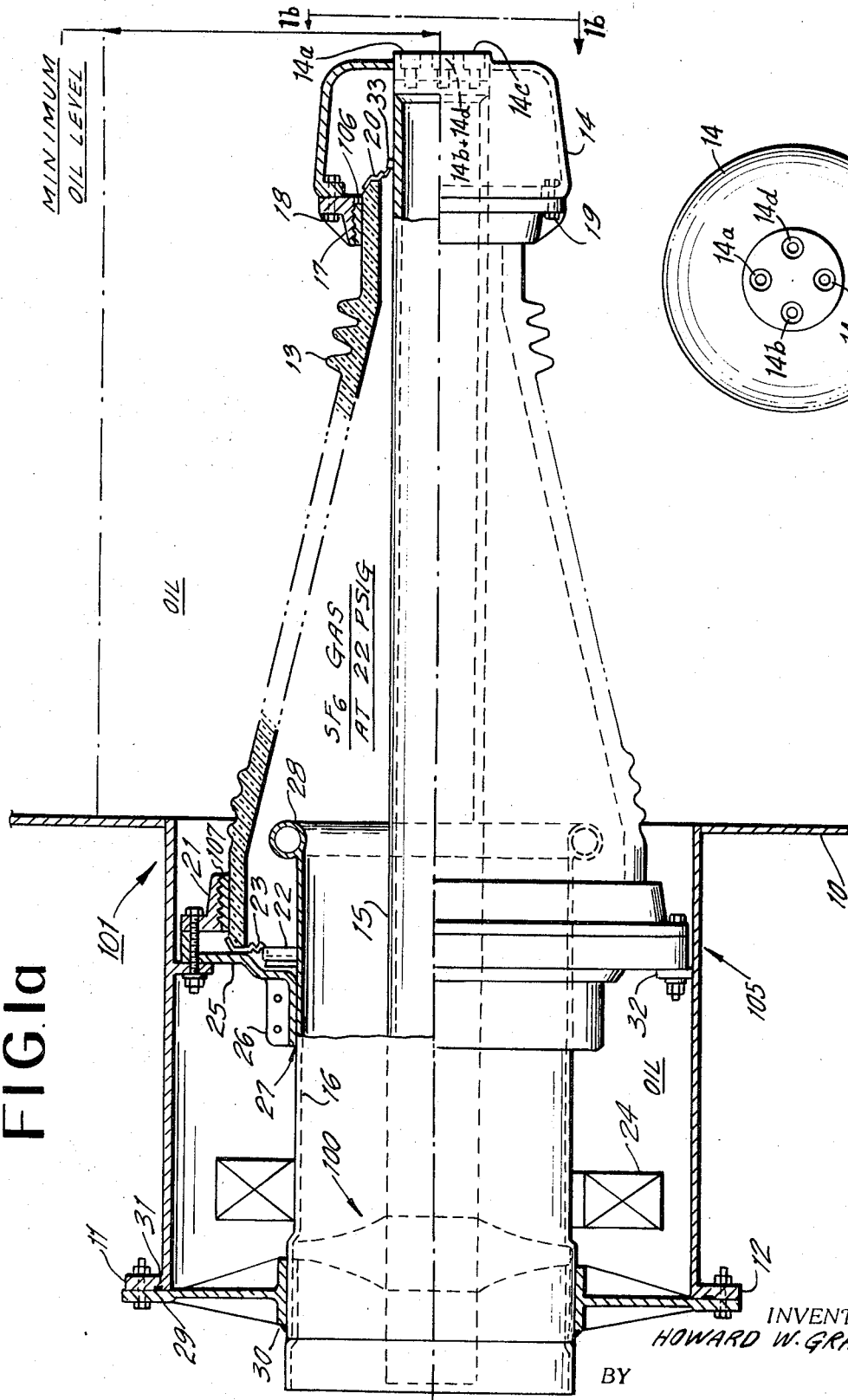

TRANSFORMER TERMINATION FOR METAL-ENCLOSED, COMPRESSED-GAS-INSULATED ELECTRICAL CONDUCTORS

The present invention relates to compressed-gas-insulated electrical conductors and, more particularly, to a novel termination design for use in high-voltage substations in which conductors or buses and other principal components are housed in grounded metal enclosures, and in which the energized parts are insulated from the enclosures by a compressed insulating gas such as sulphur hexafluoride (SF-6). Such other principal components may include circuit breakers, switches and the like, and features of compressed-gas-insulated conductor systems useful to the present invention are disclosed in pending application Ser. No. 809,889 filed Mar. 24, 1969, now U.S. Pat. No. 3,573,341 issued Apr. 6, 1971.

Compressed-gas-insulated conductors are normally comprised of metal-enclosed high-voltage electrical conductors in which a metallic conductor, generally tubular, is centrally supported within a grounded metal tube of larger diameter by means of a solid disc or cone-shape insulator. The metallic conductor is insulated from the enclosure tube by means of a compressed-gas, such as sulphur hexafluoride (SF-6), having a high dielectric characteristic. Such electrical conductors may be used as buses in electrical substations and generating stations, or for transmission of electrical power over either short, intermediate or long distances. These metal-enclosed high-voltage electrical conductors may be buried underground or supported at some convenient height above ground.

The principal advantage of compressed-gas-insulated buses in a transmission system, as compared with conventional open buses, is a tremendous reduction in the space requirement which such multiphase bus systems occupy. Whereas extra high-voltage (EHV) buses of open construction in air normally require ground clearances of 8 to 15 feet and phase spacing 15 to 25 feet, buses of the metal-enclosed compressed-gas-type can be provided with ground clearances of as little as 4 to 10 inches and phase spacings of as little as 24 to 42 inches for the same voltage ratings. In addition thereto, the compressed-gas-insulated bus having a grounded metal enclosure for each phase offers greater reliability and safety, as compared with conventional, open EHV conductors.

In the few substations which have been constructed employing compressed-gas insulated conductors, connection between metal enclosed switchgear and electrical power transformers in the substation have been made either by means of open conductors or by means of cable. With the open conductor type of arrangement, a pair of porcelain bushings are usually employed, a first bushing to bring the energized conductor out from the metal enclosure and a second bushing at the point where the energized conductor enters the metal tank of the power transformer. Characteristic of this scheme is that much of the safety advantage and space savings existing with the metal enclosed substation is reduced if exposed, energized conductors are used to connect the switchgear to the transformer. Such construction is also relatively expensive, as is the use of the high voltage cable arrangement wherein two cable terminations are required for each phase. Where the cable is oil filled, in addition, oil pressurization equipment is further required, and significantly adds to the overall cost.

It is an object of the present invention to provide a novel arrangement for terminating the metal-enclosed compressed-gas-insulated conductor directly on the tank wall of the electrical power transformer, so as to eliminate the added costs associated with the above described open conductor and cable connection arrangements.

It is another object of the invention to provide a manner of mounting "doughnut"-type current transformers in the oil of the power transformer unit at such a location as to protect the apparatus against flashover through the oil from the energized parts.

It is a further object of the invention to eliminate the conventional wound-paper condenser type of bushing which is normally used inside power transformer assemblies to distribute voltage stresses.

It is yet another object of the invention to provide a hermetically sealed termination to inhibit leakage of the insulating gas into the transformer oil.

It is also an object of the present invention to provide a termination arrangement whereby the compressed-gas-insulated conductor enters the transformer tank through a sidewall rather than through a top cover, so as not to increase substation height.

These and other objects of the invention will be more fully understood from a consideration of the following description taken in connection with the drawings in which:

FIG. 1A is a partially sectionalized view of one preferred arrangement for terminating a metal-enclosed, compressed-gas-insulated conductor at the tank wall of a power transformer according to the present invention; and FIG. 1b is a top view of a portion of FIG. 1a looking in the direction of arrows 1b—1b.

As will become clear hereinafter, the metal enclosure tube of the compressed gas conductor is secured to the metal tank wall, while the conductor tube extends into the interior of the transformer tank where it is supported and insulated from the tank wall by a hollow conical or tubular bushing of porcelain, epoxy, or other such insulating material.

DESCRIPTION OF THE INVENTION

In general, it will be seen that the arrangement of the invention includes concentric aluminum conductor and enclosure tubes which horizontally enter a transformer tank wall several feet below the minimum oil level of the transformer. A conically tapered hollow porcelain bushing is employed to support both these tubes and to insulate the one from the other at the same time. The enclosure tube enters the transformer tank wall through an outwardly extending cylindrical pocket, which provides the necessary space in which to mount current transformers of the "doughnut" type inside the tank and under the oil. In this manner, the current transformers are shielded from possible flashover from the energized high-voltage parts.

Hermetic sealing of the described system is employed by way of copper rings which are soldered to a metal glaze provided at the end of the porcelain bushing. The inner portions of these copper rings are soldered to the copper portion of explosion-bonded bi-metallic copper-aluminum rings. The aluminum portion of these bi-metal rings is then welded to the aluminum enclosure tube at the large diameter end of the tapered bushing and to the aluminum conductor tube at the smaller end of the bushing construction.

A corona ring is provided at the end of the aluminum enclosure tube inside the bushing, and the transformer tank wall is arranged so as to provide a ring of ground potential metal outside the porcelain bushing. Use of such rings prevents high concentration of dielectric stress in the immediate vicinity of the metal flange ring which is cemented to the large diameter end of the bushing. Both rings are positioned some several inches towards the live end of the bushing, and are effective in reducing the dielectric stress in their vicinities. At the same time, these grounded metal rings raise the corona onset and flashover voltages of the bushing assembly to the point at which an internal condenser bushing is no longer needed to provide uniform distribution of the voltage along the surfaces of the porcelain construction.

DESCRIPTION OF THE ARRANGEMENT OF THE DRAWING

In the partially sectionalized view shown in FIG. 1a it will be understood that the enclosure tube and conductor tube enter the left-hand side of transformer tank 101. The transformer tank wall is represented by the notation 10, and is so formed at its left-hand edge to establish an outwardly extending cylindrical shell 105 having a flange 11 extending outwardly from the left-hand end of shell 105. The shell is generally of steel or stainless steel fabrication, and when the transformer tank is shipped, a bolted and gasketed cover (not shown) is positioned to close off the cylindrical opening. When ready for field installation, however, this cover is removed and the high voltage conductor tube 15 and grounded enclosure tube 16 are inserted therethrough in accordance with the invention. Although not shown, it will be understood that the opposite wall of the transformer tank is positioned well beyond the right-hand end of FIG. 1a perhaps 15 to 25 feet to the right of wall 10. As shown, the tank 101 is generally rectangular in shape and is filled with oil at atmospheric pressure up to a few inches from the top of the tank. In the description that follows, it will be understood that the high-voltage bus 15 enters the sidewall of the transformer tank; but in some applications, this conductor may enter vertically through the top of the tank arrangement. The specific arrangement will, of course, depend on the general setup of the high-voltage substation, the type of transformer employed, and other factors of physical constraint. In all cases, however, the entire porcelain bushing 13 will be understood to be positioned beneath the surface of the oil.

As shown in the drawings, the high-voltage conductor 15 is the inner tube which enters the left-hand wall of the transformer tank 101 and extends directly from the bus construction through the inside of the transformer tank and the interior of porcelain bushing 13, to the metal casting 14 located at the right-hand end of FIG. 1a. Casting 14 serves as a support for the bushing 13, and additionally serves as the high-voltage terminal of the transformer. If desired, suitable cables or bus bar may be run to this high-voltage casting terminal 14, and can serve to couple the high voltage winding of the transformer to the terminal by means of the tapped holes 14a–14d, as indicated in FIG. 1b. (In one construction of the transformer, its core and winding coils were located under the oil surface and a few feet from the high-voltage terminal.) A disc-shaped epoxy insulator 100 is shown in the drawing as supporting the tubular conductor 15 over the length of its run, of the order of 7 to 8 feet. In one arrangement according to the invention, conductor tube 15 was fabricated of aluminum. Entry of such a conductor 15 was made through the transformer tank wall substantially horizontally, and at a distance some 22 inches below the minimum oil level of the power transformer. Such conductor 15 was concentrically arranged with the outer enclosure tube 16 (also of aluminum) and was insulated therefrom by means of a compressed-gas such as sulfurhexafluoride (SF–6) filling the hollow interior defined by conductors 15 and 16.

The porcelain bushing 13 is conical in construction, tapering from its large end at the left to its smaller end at the right. As previously noted, this bushing is used to support the conductor 15 and to further insulate it from the enclosue tube 16. One way of attaching the high-voltage terminal casting 14 to the smaller right-hand end of the conical porcelain bushing 13 is to employ a flange 17 cemented (as at 106) to a roughened surface of the bushing 13, with the casting 14 then being bolted to this flange 17 by fasteners 18, 19. The interior of bushing 13 is also filled with SF–6 insulating gas at the same pressure as the remainder of the bus system, namely 22 p.s.i. A solder seal arrangement is also shown in which a metallic ring 20 is soldered to a metal glaze provided on the porcelain bushing 13 with the inner part of the metal ring 20 being soldered, welded or otherwise hermetically sealed to the tubular conductor 15 at its right most end. One manner of accomplishing this is to solder copper rings to correspondingly positioned platinum rings fired into the glaze at the right end of porcelain bushing. The copper ring, in turn, may be soldered to the copper portion of an explosion-bonded bi-metallic copper-aluminum ring, with the aluminum ring being welded to the aluminum conductor tube 15 at the small end of the bushing.

(An alternate method of securement would be to use gaskets between a ground surface at the small end of the porcelain bushing 13 and a metal plate clamped against the ground surface of the porcelain bushing).

A second, larger diameter flange 21 is positioned at the left-hand end of the tapered bushing 13, and is electrically connected to ground potential. The flange 21 is also cemented (as at 107) to the porcelain bushing 13, and a solder-seal arrangement similar to that at its right end is effected—e.g., by welding the aluminum portion of copper-aluminum bi-metallic rings 22 to the aluminum enclosure tube 16.

Such construction thus effects a complete metallic hermetic seal between the bushing 13 and the enclosure tube 16, which in one embodiment of the invention, had an outer diameter of 18 inches. Although gasketed construction could be used to provide the hermetic seal, in the manner outlined above, such construction has the disadvantage that leak proof service over many years may not remain 100 percent effective. While loss of the SF–6 gas into the oil would not be particularly harmful, such gas would have to be replenished in an operation which could become expensive if the leak were sizable. No deleterious operation of the equipment would result, however, since the SF–6 gas is itself a good insulating medium and secondly because it would have a tendency to rise to the top of the insulating oil surface.

The current transformer 24 employed in the construction of the drawing may be of the "doughnut" or toroidal type. The current transformer 24 consists of a ring-shaped core which is made up of many thin laminations, having many turns of insulated wire wound in a toroidal manner around the core. Current transformers having ratings such as 3,000/5, 2,000/5 and 1,200/5 may be used with the invention.

The porcelain bushing 13 in one embodiment of the invention had a length of some 4 feet and tapered over this length from a diameter of some 26 inches or so to a diameter approximately 10 inches. The weight of such a bushing was supported entirely from the large clamp 25 shown bolted to the flange 21 at the large end of the bushing 13, which clamp is in turn further clamped (as at 26) and finally welded (at 27) to the exterior of the enclosure tube 16. The current transformers 24 are selected to have an inner diameter not less than 18 to 19 inches and an outer diameter not more than 33 to 34 inches. The preferred arrangement as thus far described may be located a height of 14 feet or so above ground.

It has been found that a high concentration of dielectric stress may be established in the immediate vicinity of the flange 21 cemented to the large diameter end of the bushing 13. To reduce this concentration, a corona ring 28 is provided at the end of the enclosure tube 16 inside the bushing 13 and the transformer tank 101 is grounded. The presence of this grounded transformer tank together with the corona ring combine to give a fairly uniform field in this location and raise both the corona onset and flashover voltage of the bushing assembly to a level sufficient to avoid the need for an internal condenser bushing which is conventionally employed to provide uniform voltage distribution along the surface of the bushing. It can be seen that the corona ring 28 is extended several inches (for example 7 inches) to the right of the flange 21 so as to provide a ring of ground potential metal outside the porcelain.

A ribbed aluminum casting 29 is further shown at the left hand end of FIG. 1a as surrounding the enclosure tube 16 so as to support the entire assembly of the transformer conductor-bushing arrangement. In order that the support also be oil tight, it is preferable to weld the casting to the enclosure tube as shown at 30 and to use a gasket 31 around the outer periphery of the casting to prevent oil leakage at this point. Since the oil is at atmospheric pressure, leakage prevention at these points is not particularly difficult.

Also shown in the drawing are a number of phenolic washers 32 used in securing the porcelain bushing 13 to the enclosure tube 16. The function of these washers is to help support the rather heavy weight of the porcelain bushing, which for the size set forth hereinabove, weighs about 500 pounds. These washers are selected of insulating material rather than metal because the current flowing in the conductor 15 tends to induce a voltage in the enclosure tube 16 which tries to establish a current of equal magnitude in the enclosure tube 16, but in an opposite direction to the current flowing in the conductor 15. If such were permitted to occur, the current transformers 24 would not read correctly in that they would essentially detect only the difference in the two currents; if a good metallic connection were made at this point, the current transformers employed would read almost zero current flowing in the main conductor, whereas the fact may be that a current of 3,000 amperes flows towards the right in the conductor 15 but is cancelled by an equal current of 3,000 amperes flowing in the opposite direction in the enclosure tube 16. Since the current transformer 24 surrounds both conductor 15 and enclosure 16, it would read only the net current flowing through the "hole" of the "doughnut" and would therefore be unsatisfactory as a current measuring device.

Although there has been described a preferred embodiment of this novel invention, many variations and modifications will now be apparent to those skilled in the art. Therefore, this invention is to be limited, not by the specific disclosure herein, but only by the appending claims.

I claim:

1. In combination, a high-voltage oil-filled transformer tank having an opening in one wall of the tank;
    a gas filled insulated bus comprising a tubular inner conductor surrounded by a concentric conductive tubular housing;
    one end of said inner conductor extending into said tank;
    one end of said tubular housing terminating in the region adjacent said opening;
    first means securing said tubular housing to said tank wall including a conical shaped power transformer insulator bushing surrounding said tubular conductor, the large diameter end of said bushing being secured to the tank adjacent said opening;
    second means securing the small diameter end of said bushing to said one end of said tubular conductor;
    a cylindrical shell extending outwardly from said tank wall opening and surrounding a portion of said tubular housing;
    third and fourth means respectively sealing the junctures between said bushing and said tank and between said bushing and said tubular conductor to prevent gas from said bus entering into the interior of said bushing from leaking into said tank, means mechanically securing said tubular housing to said cylindrical shell.

2. The combination of claim 1 further comprising toroidal shaped transformer means positioned within said cylindrical shell and surrounding said tubular housing.

3. The combination of claim 2 wherein said first means further includes means insulating said one end of said tubular housing from said cylindrical shell.

4. The combination of claim 1 wherein said one end of said tubular housing is provided with a corona ring to eliminate high voltage gradients at the adjacent end of said bushing.

5. The combination of claim 1 wherein said third and fourth means each comprise weldments respectively joining the bushing ends to said tubular conductor and said tubular housing.

6. The combination of claim 1 wherein said bushing is provided with metallic surfaces at each end thereof;
    said first means being comprised of a metallic ring respectively welded to said tubular housing and one of said metallic surfaces;
    said second means being comprised of a metallic ring respectively welded to said conductor and one of said metallic surfaces.

7. The combination of claim 6 wherein said metallic rings are each comprised of explosion bonded bimetallic aluminum copper rings;
    said mechanical securing means comprising a clamping assembly securing said tubular housing to the interior of said cylindrical shell;
    fifth means sealing the free end of said cylindrical shell to said tubular housing a spaced distance from said one end of said tubular housing.

* * * * *